Patented July 8, 1941

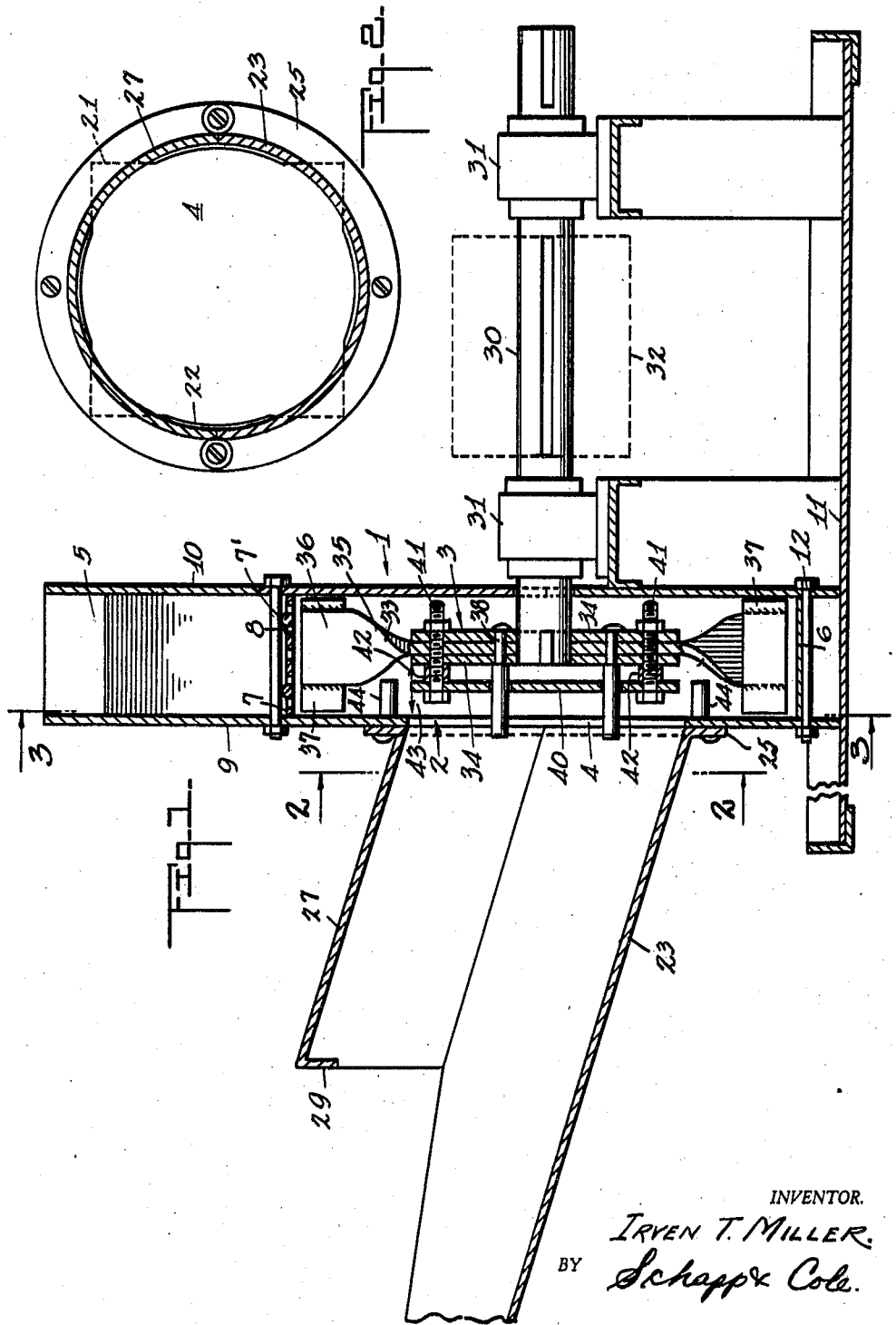

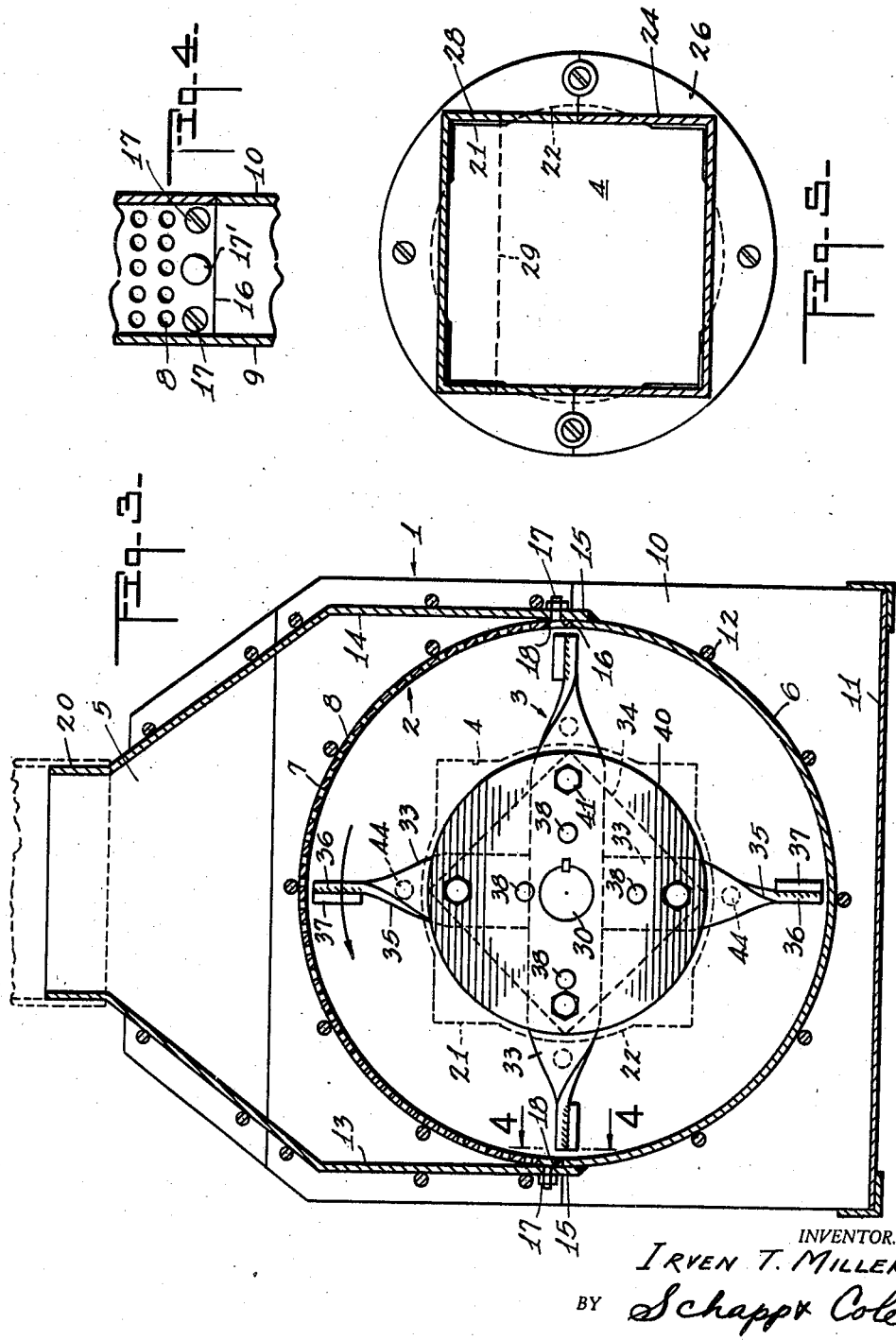

2,248,640

UNITED STATES PATENT OFFICE 2,248,640

PULVERIZER

Irven T. Miller, Modesto, Calif.

Application September 15, 1939, Serial No. 295,078

7 Claims. (Cl. 83—11)

The present invention relates to improvements in pulverizers and has particular reference to a machine for pulverizing material such as alfalfa hay, fed loosely or in the form of bales, compressed cakes of meat scraps, or fish residue, or any other suitable material.

More particularly, the present invention provides certain improvements over the pulverizers described in the Clair T. Elderkin Patent No. 2,128,727 and in my copending application Serial Number 268,132.

My invention relates to the type of pulverizer in which a rotor revolves in a cylindrical drum, which is perforated, and in which the material is fed toward one face of the rotor, to be ripped by the latter and to be thrown toward the periphery of the drum, the material being reduced by the rotor which has beaters near the drum wall, and being discharged through the drum.

In the present invention it is proposed to provide means for regulating the capacity of the pulverizer in the sense that, through a certain adjustment, the amount of feed the pulverizer will accept may be regulated. Thus when the material to be acted upon is hard and difficult to reduce, the machine may be set to slow down the feed, whereas, if the material is relatively loose and easy, the feed may be speeded up.

A further object of my invention is to provide certain structural improvements in the pulverizer.

A still further object is to provide certain improvements in the feeding means whereby the feeding device may be readily changed to adapt itself to the feeding of loose material or compressed material; and to effect a further improvement whereby material accidentally ejected from the machine through the intake is stopped in its flight and prevented from injuring the operator.

Further objects and advantages of my invention will appear as the specification proceeds and the novel features thereof will be set forth in the claims hereto appended.

The preferred form of my pulverizer is illustrated in the accompanying drawings in which:

Figure 1 shows a vertical axial section through my pulverizer;

Figure 2, a section taken along line 2—2 of Figure 1;

Figure 3, a vertical section through my pulverizer taken along line 3—3 of Figure 1;

Figure 4, a fragmentary detail view taken along line 4—4 of Figure 3; and

Figure 5, a section corresponding to that of Figure 2, with a different feed trough substituted for that of Figure 1.

While I have shown only the preferred form of my invention, I wish to have it understood that various changes or modifications may be made within the scope of the claims hereto attached without departing from the spirit of the invention.

Referring to the drawings in detail my pulverizer 1 comprises, in its principal features, a drum 2, a rotor 3 revolvable therein, an axial intake 4 for the drum and a peripheral discharge 5.

The drum 2 is preferably made in two semi-cylindrical sections 6 and 7, the former being solid and the latter being perforated, as at 8, to form a screen having reinforcing bands 7'. Both sections, when assembled, form a cylinder which is supported between two end plates 9 and 10 which form a front and a rear wall for the drum. The two plates are supported in spaced relation on a suitable base 11 and the drum sections are supported and positioned between the plates by an annular series of bolts 12.

The bottom section 6 of the drum has two plates 13 and 14 rising from its ends, the plates being off-set relative to the drum section, as at 15, to allow the upper drum section or screen to come flush with the lower section, as at 16, and to be directly secured to the plates by means of bolts 17.

The holes receiving the bolts are countersunk, as at 18, so that the entire inner face of the drum is smooth and there are no projections to interfere with the proper operation of the rotor.

An extra heavy rivet 17' may be used in addition to the regular bolts to prevent shearing of the latter.

The plates 13 and 14 are inclined toward one another after reaching the height of the top of the drum to form a gradually decreasing discharge chamber 5 for the screen, which finally terminates in a stack 20 communicating with a suitable cyclone collector or other device for receiving the discharge and for separating the solids from the air.

The front plate 9 has an intake opening 4, which is preferably arranged centrally with respect to the drum and is of considerable size. To make the intake fit different feed troughs, I preferably give it the outline shown particularly well in Figures 2 and 5, which is formed by a square and a concentric circle intersecting one another, the square forming four projecting corners 21 and the circle forming circular section 22 between the corners. It is apparent that other combination outlines may be substituted to suit varying conditions.

In the device illustrated I show two troughs 23 and 24 adapted to be interchangeably used with the feed or intake opening. The trough 23 is rounded and substantially semi-circular in cross-section at the end adjacent the intake opening so as to come flush with the circular part of the intake opening, while an attaching flange 25 covers the projecting corners 21 of the opening. (See Figure 2.)

The squared trough 24 registers with the squared portion of the intake opening and the projecting rounded portions 22 are covered by the flange 26.

The intake troughs feed into the drum by gravity and are arranged at an incline and change in cross section to become shallower at their upper and distant ends. The rounded trough is preferably used to feed loose material, such as ordinary hay, while the squared trough is preferably used to feed materials that have been pressed into cake or block form, as baled hay and other pressed blocks of material. In the latter case the intake opening should preferably be the same size as the bale or block fed.

Each of the troughs is preferably covered, near the intake, with a hood 27 and 28, the hood being shaped to complete the outline of the circle or the square as the case may be, and being formed with an inwardly turning flange 29 which diverts material, such as metal pieces, rock, grain, etc., ejected accidentally by the machine through the intake hole and prevents the latter from striking the operator.

The rotor 3 is revolvably mounted in the drum on a shaft 30 supported in two bearings 31 and projecting into the drum through the rear wall of the drum housing. Rotary motion may be imparted to the drum by any suitable means through a pulley indicated at 32.

The rotor is shown as consisting of a plurality of arms 33 extending radially from the axis of rotation and having their inner portions claimped between a pair of rectangular plates 34. The arms are flat in their central portions and are twisted near their ends, as at 35, to assume substantially transverse position at their extremities, as at 36. The extreme ends are provided with beater plates 37 of particularly strong and resisting material.

The twist in the arms is such as to produce a propeller effect whereby the material is urged toward the rear of the drum so that the whole space in the drum is utilized for the reduction.

The plates 34 are clamped upon the arms by means of bolts or rivets 38 which are made to project beyond the front plate toward the intake opening and preferably extend slightly beyond the intake opening as shown in the drawings. The bolts thus form prongs or ripping members which tear into the material fed through the intake opening and throw it toward the circumference of the drum where it becomes pulverized due to the disentegrating action of the rotor which is made to revolve at great speed.

Since the material advances toward the face of the rotor by gravity or under pressure, it is apparent that the amount of material torn away from the bulk depends greatly upon the distance between the rotor and the intake opening. The greater the distance, the more material will be thrown into the drum by the ripping member, and the less the distance, the less material will be absorbed.

With some material the capacity of mill or pulverizer using a fixed source of power, will be greater than with other material. Where the material is tough and hard to comminute the capacity will be less and where the material is comparatively brittle and easy to comminute, the capacity of the mill will be higher.

To allow the intake of the mill to be adjusted to the capacity with respect to the material to be treated, I provide a front plate 40 which is carried by the rotor and is slidable on the ripping members 38. The position of the plate relative to the rotor and the intake opening may be adjusted by means of bolts 41 extending through the plate and the rotor and suitable spacing washers or sleeves 42 around the bolts introduced between the plate and the rotor. Thus the spacing of the plate is determined by the size of the washers 42, which may be readily interchanged for others to increase or decrease the spacing.

The plate 40 is preferably circular in form and is of the same size as the circular intake opening so that when loose material is fed into the mill over the round trough, the annular discharge space between the plate and the intake opening, indicated at 43, is substantially uniform and prevents the material from bunching too heavily in spots.

The face of the plate 40 is presented to the intake opening and is substantially flat so that the material may be pushed up against the face and discharged toward the periphery without any obstacles.

The ripping members are preferably arranged at different distances from the center so that none follows the path of any other, and are further arranged substantially within the confines of the intake opening. Their front faces, in the direction of rotation, are rounded or blunt, so that they have a tendency to carry the material along with them rather than to cut through the material.

The front wall is preferably provided with a plurality of inwardly projecting prongs 44 around the intake opening, these prongs being made to cooperate with the ripping members 38 to further reduce the material.

The manner of operating my pulverizer will be readily understood from the foregoing description.

Depending upon the material to be pulverized, whether loose or solid, the rounded or the squared trough is attached to the intake opening. Where the material is rather easy to comminute the plate 40 is adjusted to leave a relatively large intake. Where the material is tough and hard to pulverize, the front plate is adjusted to come closer to the intake whereby the feed is reduced to correspond to the reduced capacity of the mill. As the material enters through the feed opening, it is ripped by the ripping members 38 and thrown outwardly at tremendous speed and is whirled around in the drum until it is sufficiently pulverized to escape through the perforations in the drum.

I claim:

1. In a pulverizer, a drum, a front and rear wall for the drum, an intake opening in the front wall, a rotor in the drum having a front face arranged opposite the intake opening and spaced therefrom and having prongs projecting from said face toward the intake opening, the front face being slidable on the prongs, and means for adjusting the spacing between the said face and the intake opening.

2. In a pulverizer, a drum, a front and rear wall for the drum, an intake opening in the front wall, a rotor in the drum having a front face arranged opposite the intake opening and spaced therefrom and having prongs projecting from said face toward the intake opening, the front face being slidable on the prongs, and means for adjusting the spacing between the said face and the intake opening, the said means being arranged to leave the position of the prongs relative to the opening unaffected.

3. In a pulverizer, a drum, a front and rear wall for the drum, an intake opening in the front wall, a rotor in the drum and comprising a body section and a plate facing the intake opening, prongs projecting from the body section through the plate toward the intake opening, and means for adjusting the spacing of the plate relative to the body section and the intake opening.

4. In a pulverizer, a drum, a front and rear wall for the drum, an intake opening in the front wall, a rotor in the drum and comprising a body section and a plate facing the intake opening, prongs projecting from the body section through the plate toward the intake opening, and means for adjusting the spacing of the plate relative to the body section and the intake opening, the latter means comprising bolts holding the plate to the body section of the rotor and spacing members adapted to be interchangeably interposed between the plate and the body section.

5. In a pulverizer, a drum having a front wall member and an intake opening in said member, a rotory member in the drum having a face arranged opposite the intake opening and spaced therefrom, prongs projecting from one of said members toward the other member and means slidable on said prongs for adjusting the spacing between the front wall member and the face of the rotary member.

6. In a pulverizer, a drum, a front and rear wall for the drum, an intake opening in the front wall, a rotor in the drum and comprising a body section and a plate facing the intake opening and means for adjusting the spacing of the plate relative to the body section and the intake opening, the latter means comprising bolts holding the plate to the body section of the rotor and spacing members adapted to be interchangeably interposed between the plate and the body section.

7. In a pulverizer, a drum, a front wall for the drum, an intake opening in the front wall, a rotor in the drum mounted opposite the intake opening, a plate, a series of bolts for securing the plate to the rotor between the latter and the intake opening, and spacing members adapted to be interchangeably interposed between the plate and the rotor for uniformly adjusting the spacing between the plate and the intake opening.

IRVEN T. MILLER.